United States Patent
Lee

(10) Patent No.: US 10,592,031 B2
(45) Date of Patent: Mar. 17, 2020

(54) DISPLAY DEVICE

(71) Applicant: LG Display Co., Ltd., Seoul (KR)

(72) Inventor: JunYeob Lee, Osan-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/052,417

(22) Filed: Aug. 1, 2018

(65) Prior Publication Data
US 2019/0042038 A1 Feb. 7, 2019

(30) Foreign Application Priority Data

Aug. 4, 2017 (KR) ........................ 10-2017-0099060

(51) Int. Cl.
*G06F 3/041* (2006.01)
*G06F 3/047* (2006.01)
*G06F 1/16* (2006.01)
*G06F 3/044* (2006.01)

(52) U.S. Cl.
CPC .......... *G06F 3/0412* (2013.01); *G06F 1/1626* (2013.01); *G06F 1/1643* (2013.01); *G06F 1/1652* (2013.01); *G06F 3/044* (2013.01); *G06F 3/047* (2013.01); *G06F 3/0416* (2013.01); *G06F 2203/04112* (2013.01)

(58) Field of Classification Search
CPC ...... G06F 3/0412; G06F 3/0416; G06F 3/044; G06F 3/047; G06F 1/1643; G06F 2203/04112
See application file for complete search history.

(56) References Cited

U.S. PATENT DOCUMENTS

| 2015/0253893 | A1 | 9/2015 | Yilmaz et al. |
| 2017/0123452 | A1* | 5/2017 | Evans, V .......... G02F 1/133305 |
| 2017/0308200 | A1* | 10/2017 | Mugiraneza ............ G06F 3/044 |
| 2018/0188867 | A1* | 7/2018 | Yeh ........................ G06F 3/0416 |
| 2019/0004626 | A1* | 1/2019 | Ko ........................... G06F 3/044 |

FOREIGN PATENT DOCUMENTS

KR 20160091178 A 8/2016

* cited by examiner

*Primary Examiner* — Kent W Chang
*Assistant Examiner* — Andrew Lee
(74) *Attorney, Agent, or Firm* — Fenwick & West LLP

(57) ABSTRACT

A display device is disclosed, which has excellent touch sensitivity due to a corner area of a screen, wherein the corner area is formed to be curved. The display device comprises a substrate including a touch area having a corner touch area; a plurality of gate lines arranged on the substrate in a first direction; a plurality of data lines arranged in a second direction crossing the first direction; a plurality of pixel areas defined by crossing the plurality of gate lines and the plurality of data lines; a plurality of common electrodes arranged to overlap at least one pixel area; and a plurality of touch link lines electrically connected with the plurality of common electrodes and extended in a direction parallel with the first direction or the second direction, wherein, among the plurality of common electrodes, the first common electrodes arranged on the corner touch area have shape different from that of the second common electrodes arranged on the other touch area except the corner touch area.

13 Claims, 9 Drawing Sheets

DISPLAY DEVICE

CROSS REFERENCE TO RELATED APPLICATIONS

This application claims the benefit of the Korean Patent Application No. 10-2017-0099060 filed on Aug. 4, 2017, which is hereby incorporated by reference for all purposes as if fully set forth herein.

BACKGROUND OF THE INVENTION

Field of the Invention

The present invention relates to a display device.

Discussion of the Related Art

Related technologies in the field of a display device for displaying visual information as an image or a picture in the information age have been developed. Particularly, an example of the display device includes a touch display device having a display panel that may recognize a position where a touch has occurred and touch intensity if a user contacts a display area where an image is displayed, by using a finger or pen or applies a force to the display area. For immediate and mutual communication between a user and a machine, the touch display device is widely used for a tablet PC (personal computer), a smart watch, a watch phone, a wearable device, an electronic diary, an electronic book, a PMP (portable multimedia player), a navigation system, a television, a notebook computer, a monitor, a camera, a camcorder, or a home appliance without limitation to a smart phone, a mobile communication terminal, or a mobile phone.

The touch display device may be categorized into an on-cell type in which a touch panel including touch electrodes for recognizing a touch is provided separately from a display panel for displaying an image and an in-cell type in which touch elements including touch electrodes for recognizing a touch are built in a display panel.

Since the recent display device includes a corner area of a housing and a cover window has a curved (or rounded) shape, improved esthetic design may be obtained due to the more natural shape of the corner area, and a screen of the corner area may be displayed more naturally.

SUMMARY OF THE INVENTION

Accordingly, the present invention is directed to a display device that substantially obviates one or more problems due to limitations and disadvantages of the related art.

An advantage of the present invention is to provide a display device having excellent touch sensitivity due to a corner area of a screen, which is formed to be curved.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

A display device according to one embodiment of the present invention comprises a substrate including a touch area having a corner touch area; a plurality of gate lines arranged on the substrate in a first direction; a plurality of data lines arranged in a second direction crossing the first direction; a plurality of pixel areas defined by crossing the plurality of gate lines and the plurality of data lines; a plurality of common electrodes arranged to overlap at least one pixel area; and a plurality of touch link lines each of which is electrically connected with a corresponding one of the plurality of common electrodes and extended in a direction parallel with the first direction or the second direction, wherein, among the plurality of common electrodes, the first common electrodes arranged on the corner touch area have shape different from that of the second common electrodes arranged on the other touch area except the corner touch area.

In another aspect of the present invention, a display device according to one embodiment of the present invention comprises a substrate including a touch area having a corner touch area; a plurality of gate lines arranged on the substrate in a first direction; a plurality of data lines arranged in a second direction crossing the first direction; a plurality of pixel areas defined by crossing the plurality of gate lines and the plurality of data lines; a plurality of common electrodes arranged to overlap at least one pixel area; and a plurality of touch link lines each of which is electrically connected with a corresponding one of the plurality of common electrodes and extended in a direction parallel with the first direction or the second direction, wherein, among the plurality of touch link lines, a first interval between first touch link lines passing through first common electrodes arranged in an edge of the touch area including the corner touch area is different from a second interval between second touch link lines passing through second common electrodes arranged other touch area except the edge of the touch area through which the first touch link lines pass.

In still another aspect of the invention, a display device comprises a plurality of common electrodes, wherein the common electrodes comprise first common electrodes arranged in an edge of a touch area of the display device in a first direction including a corner touch area, and second common electrodes arranged in other touch area except the edge of the touch area. The display device also comprises a plurality of touch link lines including first touch link lines and second touch link lines, each of the first touch link lines electrically connected with a corresponding one of the first common electrodes and spaced apart from each other at a first interval, and each of the second touch link lines electrically connected with a corresponding one of the second common electrodes and spaced apart from each other at a second interval wider than the first interval.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
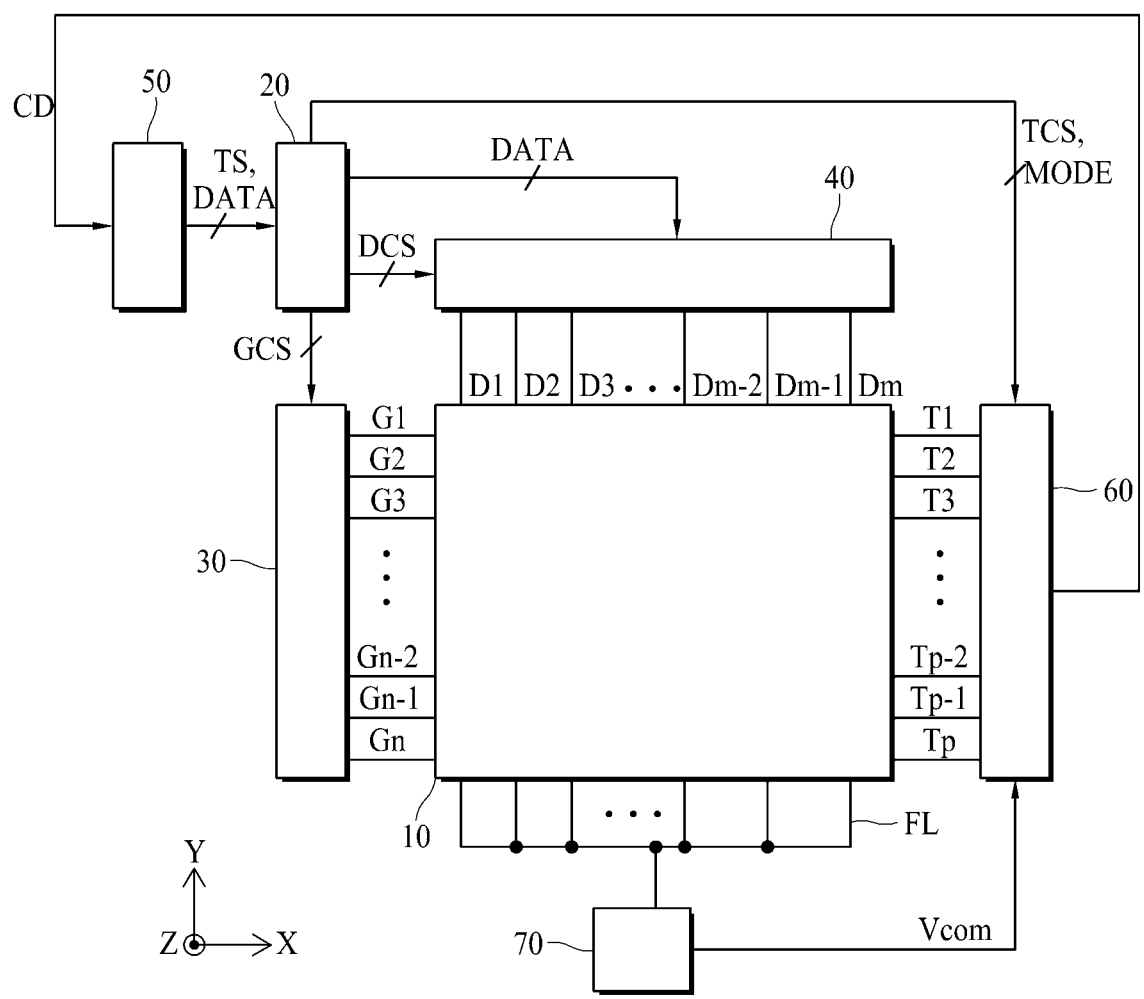
FIGS. 1 and 2 are block diagrams illustrating a display device according to the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout the specification. In the following description, when the detailed description of the relevant known function or configuration is determined to unnecessarily obscure the important point of the present invention, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~','above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another element. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, the preferred embodiments of the present invention will be described in detail with reference to the accompanying drawings.

Figure 2:
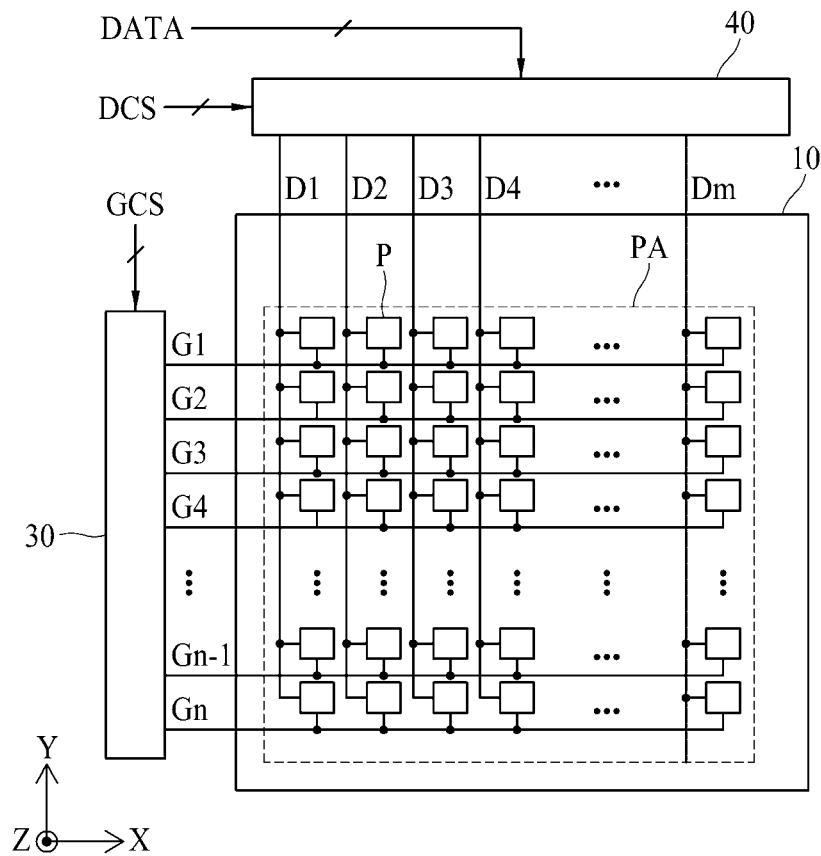
Figure 3:
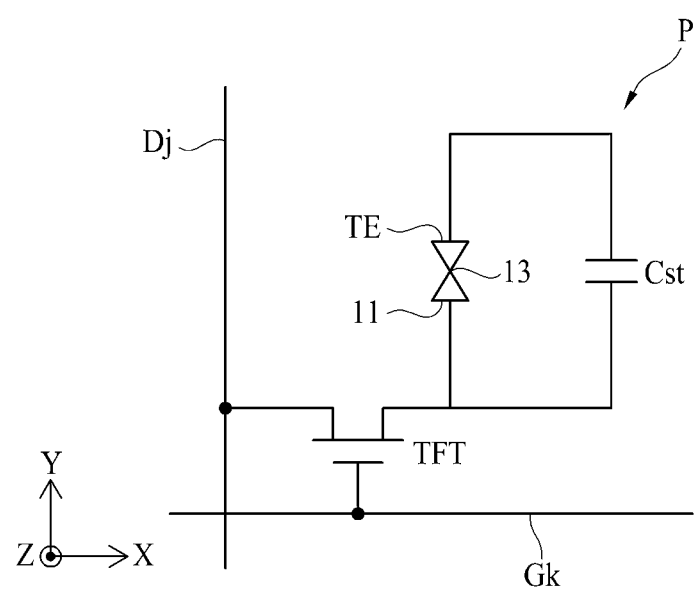
FIG. 3 is a circuit diagram illustrating a pixel according to one embodiment of the present invention.

FIGS. 1 and 2 are block diagrams illustrating a display device according to the present invention, and FIG. 3 is a circuit diagram illustrating a pixel according to one embodiment of the present invention. Hereinafter, description will be given based on that the display device according to the present invention is a liquid crystal display device.

The display device according to the present invention comprises a display panel 10, a timing controller 20, a gate driver 30, a data driver 40, a main processor 50, a touch driver 60, and a common voltage compensator 70.

The display panel 10 includes a lower substrate, an upper substrate, and a liquid crystal layer interposed between the lower substrate and the upper substrate. On the lower substrate of the display panel 10, data lines D1 to Dm, gate lines G1 to Gn, touch link lines T1 to Tp, and feedback lines FL are formed.

The gate lines G1 to Gn are arranged in a first direction. The first direction is defined as X-axis direction in FIG. 1. The data lines D1 to Dm are arranged in a second direction crossing the first direction. The second direction is defined as Y-axis direction. Therefore, the data lines D1 to Dm are arranged to cross the gate lines G1 to Gn. Pixels P may be formed at crossing portions between the data lines D1 to Dm and the gate lines G1 to Gn. Each of the pixels P may be connected to the data lines D1 to Dm and the gate lines G1 to Gn. The touch link lines T1 to Tp are extended in a direction parallel with the first direction (X) or the second direction (Y). Although FIG. 1 illustrates that the touch link lines T1 to Tp are extended in a direction parallel with the second direction Y, the touch link lines T1 to Tp may be extended in a direction parallel with the first direction X.

Each of the pixels P may include a transistor TFT, a pixel electrode 11, a common electrode TE, and a storage capacitor Cst. The transistor TFT is turned on by a gate signal of the kth gate line Gk (k is a positive integer that satisfies $1 \leq k \leq n$), and supplies a data voltage of the jth data line Dj (j is a positive integer that satisfies $1 \leq j \leq m$) to the pixel electrode 11.

The common electrode TE is supplied with a common voltage Vcom from the touch link lines T1 to Tp connected to the touch driver 60. For this reason, each of the pixels P may control a transmittance ratio of light entering from a backlight unit by driving liquid crystals of the liquid crystal layer 13 by means of an electric field generated by a potential difference between the data voltage supplied to the pixel electrode 11 and the common voltage Vcom supplied to the common electrode TE. As a result, the pixels P may display an image. The storage capacitor Cst is provided between the pixel electrode 11 and the common electrode TE, and uniformly maintains a voltage difference between the pixel electrode 11 and the common electrode TE.

The common electrode TE is provided to overlap at least one pixel, and may be defined as a touch sensor for touch sensing or a touch electrode. For example, the common electrode TE may include a transparent conductive material such as ITO (Indium Tin Oxide).

One common electrode TE may have a size corresponding to the plurality of pixels. For example, one common electrode TE may have a size corresponding to 40 pixels in a first direction X parallel with a length direction of the gate lines G1 to Gn and 12 pixels in a second direction Y parallel with a length direction of the data lines D1 to Dm. In this case, one common electrode TE may have a size corresponding to 480 pixel areas. However, without limitation to this case, each of the common electrodes TE may be varied depending on size (or resolution) and touch resolution of the display panel.

The feedback line FL connects the common voltage compensator 70 with at least one of the pixels P. The feedback line FL feeds the common voltage Vcom supplied to at least one pixel P back to the common voltage compensator 70.

On the upper substrate of the display panel 10, a black matrix and a color filter, which identify each of the pixels P so as not to allow light emitted from the pixels P to be mixed with each other. However, if the display panel 10 is formed in a COT (Color filter On TFT) structure, the black matrix and the color filter may be formed on the lower substrate of the display panel 10.

On each of the upper substrate and the lower substrate of the display panel 10, a polarizer is attached and an alignment film for setting a pre-tilt angle of liquid crystal is formed. A column spacer for maintaining a cell gap of a liquid crystal cell is formed between the upper substrate and the lower substrate of the display panel 10.

The display panel 10 includes a display area comprised of a plurality of pixels P, and a non-display area surrounding the display area. At this time, each corner of the display area may have a curved shape having a predetermined curvature radius.

The backlight unit may be arranged below a rear surface of the lower substrate of the display panel 10. The backlight unit may be realized as an edge type or a direct type to irradiate light to the display panel 10.

The timing controller 20 receives timing signals TS and digital video data DATA from the main processor 50. The timing signals TS may include a vertical synchronization signal, a horizontal synchronization signal, a data enable signal, and a dot clock. The vertical synchronization signal is the signal for defining one frame period. The horizontal synchronization signal is the signal for defining one horizontal period to simultaneously supply the data voltages to one pixel column arranged in a direction parallel with the extension direction of the gate lines G1 to Gn of the display panel 10. The pixels arranged on the pixel column are connected to the same gate line. The enable signal is the signal for defining a supply period of valid digital video data DATA. The dot clock is a clock signal repeated at a cycle preset by a timer in the timing controller 20.

The timing controller 20 may generate a mode signal MODE for identifying a display mode from a touch mode on the basis of the vertical synchronization signal. For example, the timing controller 20 may output a mode signal MODE of a first logic level voltage for a display period and output a mode signal MODE of a second logic level voltage for a touch period.

The timing controller 20 generates a gate control signal GCS for controlling operation timing of the gate driver 30 and a data control signal DCS for controlling operation timing of the data driver 40 based on the timing signals TS. The timing controller 20 generates a touch control signal TCS for controlling operation timing of the touch driver 60. For the display period, the timing controller 20 may output the gate control signal GCS to the gate driver 30 and output the digital video data DATA and the data control signal DCS to the data driver 40. The timing controller 20 may output the touch control signal TCS and the mode signal MODE to the touch driver 60.

The gate driver 30 generates gate signals in accordance with the gate control signal GCS supplied from the timing controller 40 for the display period. The gate driver 30 supplies the gate signals to the gate lines G1 to Gn in a previously determined order for the display period. The previously determined order may be a sequential order. The gate driver 30 according to one example may be integrated (or built) in the non-display area at one side of the display panel 10 during the manufacturing process of the transistor TFT and connected with the gate lines G1 to Gn one to one. As another example, the data driver 30 may be comprised of an integrated circuit, packaged in the display panel 10 and connected with the gate lines G1 to Gn one to one.

The data driver 40 receives the digital video data DATA and the data control signal DCS from the timing controller 20 for the display period. The data driver 40 converts the digital video data DATA to analog data voltages in accordance with the data control signal DCS for the display period. The data driver 40 supplies the data voltages to the data lines D1 to Dm for the display period.

The main processor 50 may be realized as a central processing unit (CPU) packaged in a main board of the display device, a host processor, an application processor or a graphic processing unit (GPU). The main processor 50 converts the digital video data DATA and the timing signals TS to a suitable format for display on the display panel 10 and transmits the converted data to the timing controller 20.

Also, the main processor 50 may receive touch coordinate data CD from the touch driver 60. The main processor 50 may execute an application program associated with a coordinate, in which a touch is generated by a user, in accordance with the touch coordinate data CD. The main processor 50 may transmit the digital video data DATA and the timing signals TS based on the executed program to the timing controller 20.

The touch driver 60 receives the touch control signal TCS and the mode signal MODE from the timing controller 20. The touch driver 60 receives the common voltage Vcom from the common voltage compensator 70.

The touch driver 60 may be operated by being divided into the display period and the touch period in accordance with the mode signal MODE.

The touch driver 60 receives the common voltage Vcom supplied form the common voltage compensator 70 and supplies the common voltage Vcom to the common electrodes TE for the display period at the same time.

The touch driver 60 generates a touch driving signal TDS in accordance with the touch control signal TCS for the touch period TP. The touch driver 60 may supply the touch driving signal TDS to the touch link lines T1 to Tp in a previously determined order. If the previously determined order is a sequential order, the touch driver 60 may sequentially supply the touch driving signal TDS to the first to pth touch link lines T1 to Tp.

The touch driver 60 receives touch sensing signals based on a change of capacitance of each of the common electrodes TE through the touch link lines T1 to Tp. The touch driver 60 may calculate touch coordinate(s) where a touch has occurred by performing operation for the touch sensing signals using a predetermined algorithm. The touch driver 60 supplies the touch coordinate data CD, which includes the touch coordinate(s), to the main processor 50. In this case, the main processor 50 executes an application program associated with a coordinate, in which a touch is generated by a user, in accordance with the touch coordinate data CD, and transmits the digital video data DATA and the timing signals based on the executed program to the timing controller 20.

Selectively, the touch driver 60 may generate touch raw data by converting the touch sensing signals to analog-to-digital data and provide the generated touch raw data to the main processor 50. In this case, the main processor 50 may calculate touch coordinate(s) where a touch has occurred by performing operation for the touch raw data provided from the touch driver 60 using a predetermined algorithm and execute an application program associated with the touch coordinate(s).

The common voltage compensator 70 compensates for the common voltage Vcom to uniformly maintain a potential of the common voltage Vcom on the basis of the feedback result, and supplies the common voltage Vcom having a uniform potential to the touch driver 60. That is, the common voltage compensator 70 uniformly maintains the potential of the common voltage supplied to the common electrode for the display period by controlling the potential of the common voltage by receiving the common voltage Vcom supplied to the common electrode and fed back through the feedback line FL. The common voltage compensator 70 according to one example compensates for a common voltage variation of the common electrodes TE from the feedback line FL on the basis of a reference common voltage input from a power supply source. At this time, the common voltage compensator 70 is operated by being divided into the display period and the touch period and compensates for the common voltage Vcom in accordance with a voltage variation of the feedback line FL for the display period only. For example, the common voltage compensator 70 may output the common voltage of which common voltage variation affected by unspecified noise generated in the display panel 10 is compensated by inverting and amplifying the common voltage variation reflected in the feedback line FL at a reference common voltage level.

In the display device according to one embodiment of the present invention, the timing controller 20, the data driver 40, the touch driver 60, and the common voltage compensator 70 may constitute a driving circuit portion (or unified driving integrated circuit) realized as one integrated circuit. Moreover, the gate driver 30 may be built in the driving circuit portion not the display panel 10.

As shown in FIGS. 1 and 2, since the display device according to one embodiment of the present invention is provided in an in-cell touch type in which the common electrode TE provided in the display panel 10 is used as a touch electrode, a separate touch panel is not required, whereby the display device may have thin thickness. However, the display device according to one embodiment of the present invention may be applied to an on-cell touch type in which a separate touch panel having touch electrodes and touch routing lines are arranged on the display panel.

Figure 4:
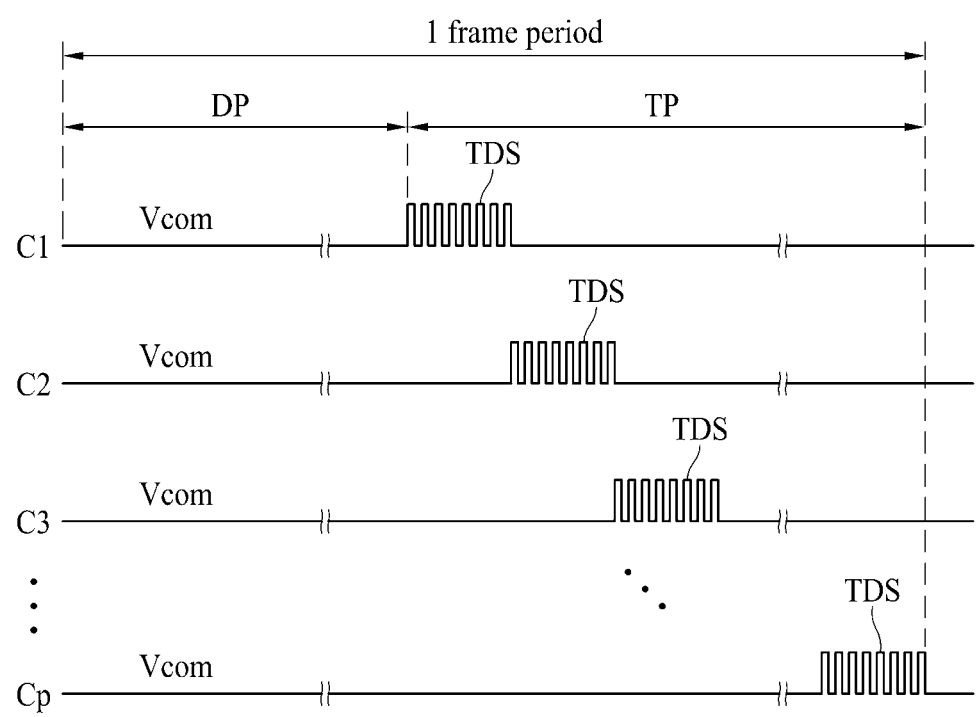
FIG. 4 is a waveform illustrating a common voltage supplied to common electrodes and a touch driving signal for a display period and a touch period of one frame period of a display device according to the present invention.

FIG. 4 is a waveform illustrating a common voltage supplied to common electrodes and a touch driving signal for a display period and a touch period of one frame period of a display device according to the present invention.

The display device according to the present invention is driven by time division of one frame period into a display period DP and a touch period TP to perform both image display and touch sensing. The timing controller 20 may operate the in-cell touch display device according to the present invention in a display mode for the display period DP of one frame period, and may operate the same in a touch mode for the touch period TP. For example, if one frame period is 16.7 ms, the display device may be driven by dividing the display period DP within one frame period into 10.7 ms and the touch period into 6 ms. However, the display device of the present invention is not limited to this case.

The touch driver 60 supplies the common voltage Vcom to the common electrodes TE through the touch link lines T1 to Tp for the display period DP. The touch driver 60 supplies the touch driving signal TDS to the common electrodes TE through the touch link lines T1 to Tp for the touch period TP, and senses a change of capacitance of the common electrodes TE through the touch link lines T1 to Tp. Therefore, the common electrode TE is used as a touch electrode for touch sensing for the touch period TP.

Although FIG. 4 illustrates that one frame period includes one display period DP and one touch period TP, it is to be understood that the present invention is not limited to the example of FIG. 4. That is, one frame period may include a plurality of display periods DP and a plurality of touch periods TP. The touch driving signal TDS may include a plurality of pulses. Also, although description of FIG. 4 will be given based on that the touch driving signal TDS has a voltage of a higher level than the common voltage Vcom, the present invention is not limited to the example of FIG. 4. That is, the touch driving signal TDS may have a voltage of a lower level than the common voltage Vcom.

Figure 5:
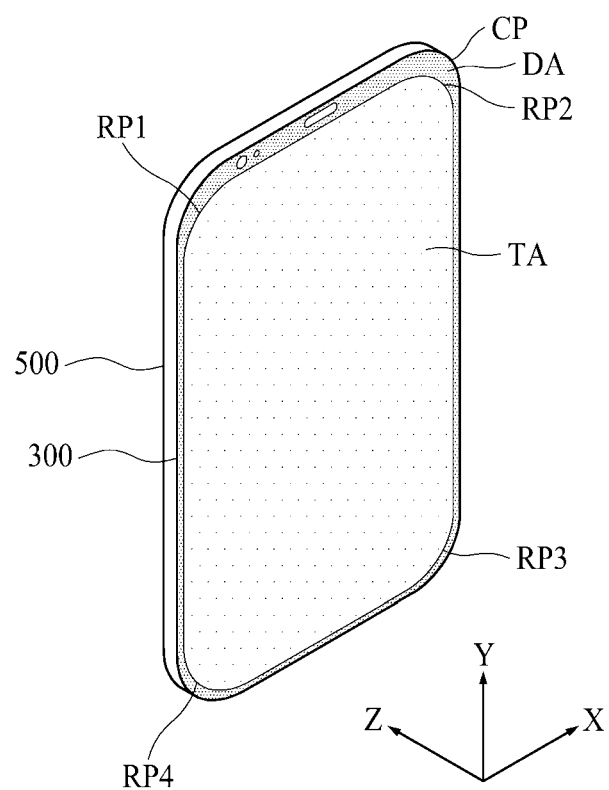
FIG. 5 is a perspective view illustrating a display device according to the present invention.

FIG. 5 is a perspective view illustrating a display device according to the present invention.

Referring to FIG. 5, the display device according to the present invention comprises a cover window 300 and a housing 500.

The cover window 300 is arranged to cover an entire front surface of the display panel and then supported in the housing 500 or attached to the entire front surface of the display panel 10 and then supported in the housing 500. The cover window 300 may be a reinforcing glass, a transparent plastic, or a transparent film.

The cover window 300 includes a transparent area TA, a decorative area DA, and a rounding corner portion CP.

The transparent area TA is provided on a center area of the cover window 300 to overlap the display area (or touch area) of the display panel, and may be defined as an area where an image displayed on the display panel is transmitted. The transparent area TA may include rounding portions RP1, RP2, RP3 and RP4 provided at each corner portion, wherein the rounding portions RP1, RP2, RP3 and RP4 may have a curved shape having a predetermined curvature radius.

The decorative area DA is provided at an edge area of the cover window 300 except the transparent area TA, and covers the other area except the display area of the display panel. The decorative area DA may be expressed as a printing layer printed on the cover window to have a predetermined color. The decorative area DA may include a camera hole, a sensor hole, a camera flash hole, and/or a speaker hole.

The rounding corner portion CP is formed at each corner portion of the cover window 300 in a curved shape having a predetermined curvature radius. The housing 500 supports the cover window 300 while receiving the display panel 10. The housing 500 directly surrounds a rear surface and each side of the display panel 10 attached to the cover window 300. Each corner portion of the housing 500 is rounded in a curved shape having a predetermined curvature radius corresponding to the rounding corner portion CP of the cover window 300.

In the display device according to the present invention, each corner portion CP of the cover window 300 and the housing 500 is rounded in a curved shape without having a right angle shape, whereby an improved esthetic design may be obtained due to the more natural shape of each corner portion, and a screen of the corner portion may be displayed more naturally.

Figure 6:
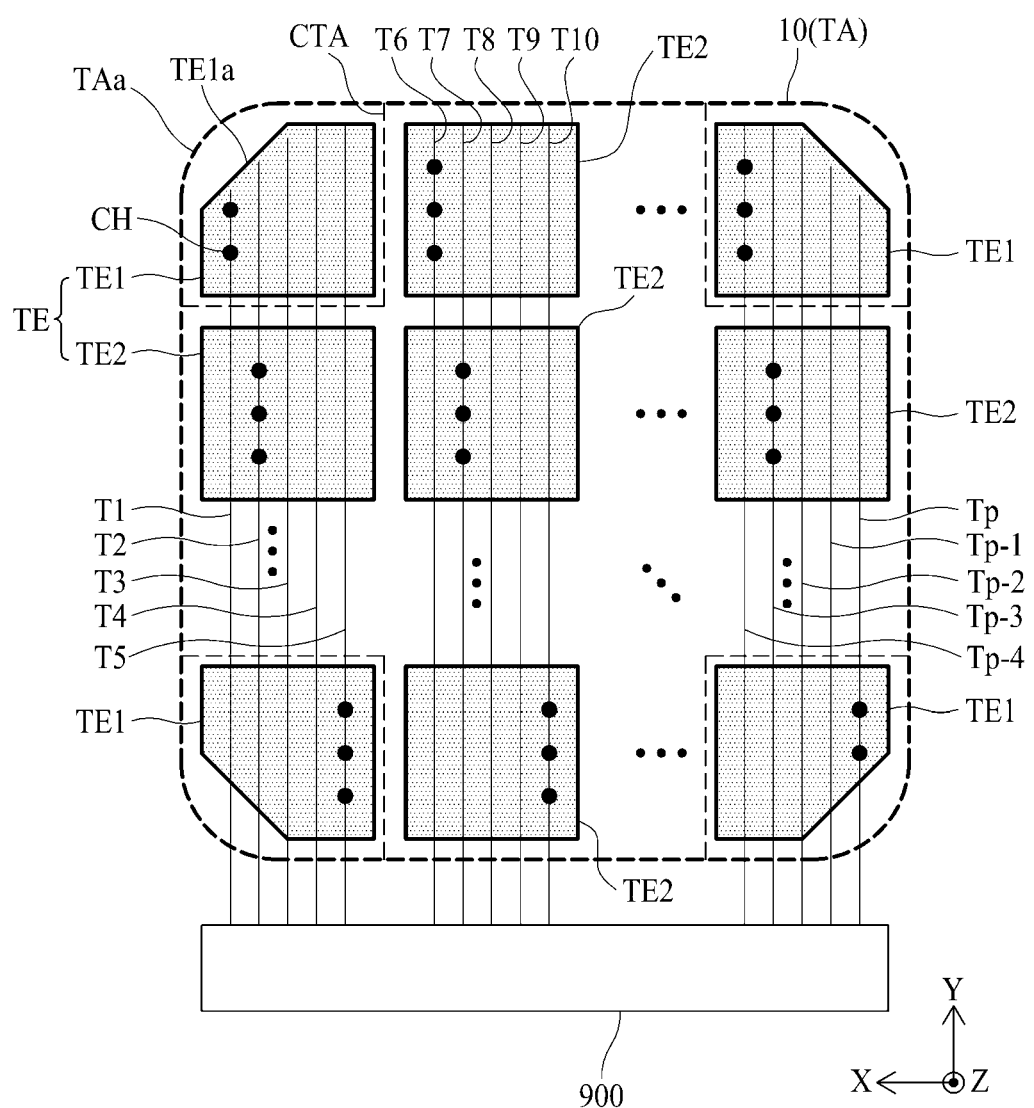
FIG. 6 is a plane view illustrating a connection structure between a plurality of common electrodes and a driving circuit portion in a display device according to one embodiment of the present invention.

FIG. 6 is a plane view illustrating a connection structure between a plurality of common electrodes and a driving circuit portion in a display device according to one embodiment of the present invention.

Referring to FIG. 6, the display device according to one embodiment of the present invention comprises a plurality of common electrodes TE arranged on a touch area TA defined on the display panel, a plurality of touch link lines T1 to Tp connected with a plurality of common electrodes TE one to one, and a driving circuit portion 900 connected with the plurality of touch link lines T1 to Tp.

The touch area TA is defined to overlap the display area of the display panel. Each corner portion TAa of the touch area TA is rounded in a curved shape having a predetermined curvature radius. The touch area TA may include corner touch areas CTA adjacent to each corner portion TAa, and other non-corner touch areas except the corner touch areas CTA. For example, the corner touch areas CTA may include corner areas at a left upper side, a right upper side, a left lower side and a right lower side of the touch area TA based on a plane. The non-corner touch area may include a center area of the touch area TA, a left edge area of the center area, a right edge area of the center area, an upper edge area of the center area, and a lower edge area of the center area except each of the corner areas at the left upper side, the right upper side, the left lower side and the right lower side of the touch area TA.

The plurality of common electrodes TE are arranged to be spaced apart from one another on the touch area TA defined on the display panel. At this time, among the plurality of common electrodes, corner common electrodes TE1 arranged on a corner touch area CTA have a shape different from that of non-corner common electrodes TE2 arranged on the other touch area TA except the corner touch area CTA. That is, the plurality of common electrodes TE arranged on the corner touch area CAT of the touch area TA may be defined as corner common electrodes TE1 (or first common electrodes), and the plurality of corner electrodes TE arranged on the other touch area TA except the corner touch area CAT of the touch area TA may be defined as non-corner common electrodes TE2 (or center common electrodes or second common electrodes). In this case, the corner common electrodes TE2 may be referred to as the first common electrodes, and the non-corner common electrodes TE2 may be referred to as the second common electrodes or the center common electrodes.

The corner common electrodes TE1 according to one embodiment may have a different shape (or different size) from the non-corner common electrodes TE2. For example, the corner common electrodes TE1 have a square shape, and include a chamfer TE1a corner-cut in an oblique or straight shape at one corner adjacent to the corner portion TAa of the touch area TA. The non-corner common electrodes TE2 have a square shape.

The plurality of touch link lines T1 to Tp are electrically connected to the plurality of common electrodes TE one to one and extended in a direction parallel with the first direction X or the second direction Y. The plurality of touch link lines T1 to Tp are arranged at constant intervals along a direction crossing their extension direction.

Each of the plurality of touch link lines T1 to Tp is electrically connected with the corresponding common electrode TE through a contact hole CH.

For example, if five touch link lines T1 to T5, T6 to T10 and Tp-4 to Tp are arranged to overlap five common electrodes TE arranged along the second direction Y, the first touch link lines T1, T6 and Tp-4 may respectively be connected to the common electrodes TE arranged at the first column, the second touch link lines T2, T7 and Tp-3 may respectively be connected to the common electrodes TE arranged at the second column, the third touch link lines T3, T8 and Tp-2 may respectively be connected to the common electrodes TE arranged at the third column, the fourth touch link lines T4, T9 and Tp-1 may respectively be connected to the common electrodes TE arranged at the fourth column, and the fifth touch link lines T5, T10 and Tp may respectively be connected to the common electrodes TE arranged at the fifth column.

Each of the plurality of touch link lines T1 to Tp is made of metal or alloy having electrical conductivity more excellent than that of the common electrodes TE. The plurality of touch link lines T1 to Tp according to one example may have a single layered structure or multi-layered structure made of a metal material such as Mo, Ag, Ti, Cu, Al, Ti/Al/Ti, and Mo/Al/Mo.

The driving circuit portion 900 is connected with the plurality of touch link lines T1 to Tp one to one. The driving circuit portion 900 supplies the common voltage to the plurality of common electrodes TE through each of the plurality of touch link lines T1 to Tp for the display period. After supplying the touch driving signal TS to each of the plurality of common electrodes TE through each of the plurality of touch link lines T1 to Tp for the touch period, the driving circuit portion 900 senses a change of capacitance of the common electrodes TE through the touch link lines T1 to Tp. The driving circuit portion 900 may be one integrated circuit or unified driving integrated circuit, which includes the timing controller 20, the data driver 40, the touch driver 60, and the common voltage compensator 70, which are shown in FIGS. 1 and 2. Moreover, the driving circuit portion 900 may further include the gate driver 30 shown in FIGS. 1 and 2.

As described above, according to one embodiment of the present invention, the chamfer portion TE1a may be formed at one corner of the corner common electrodes TE1 facing the corner portion TAa of the touch area TA, and the corner portion TAa of the touch area TA may be rounded in a curved shape, whereby the corner area of the display device may be realized in a more natural curved shape and esthetic design of the display device may be improved.

Figure 7:
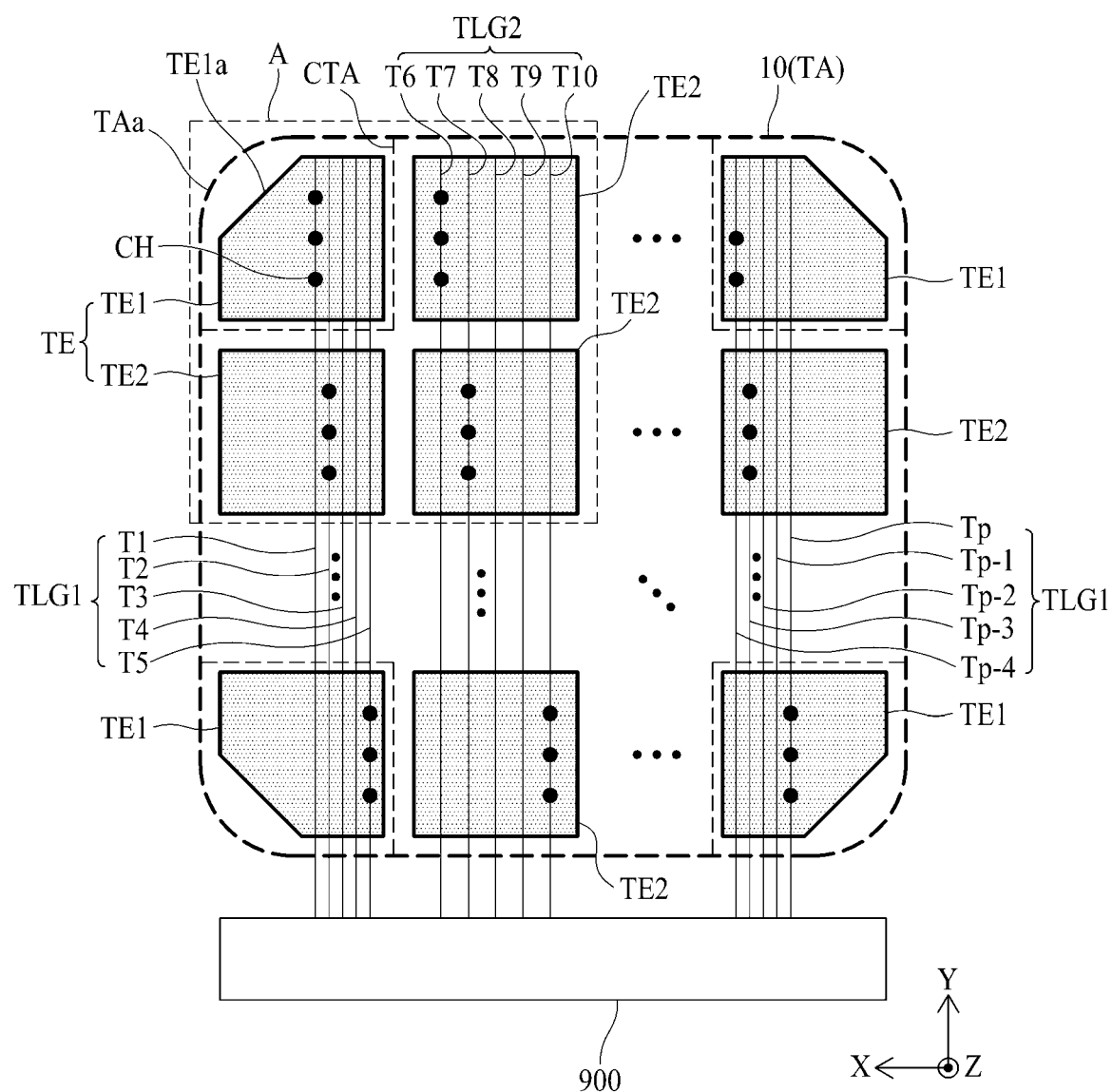
FIG. 7 is a plane view illustrating a connection structure between a plurality of common electrodes and a driving circuit portion in a display device according to another embodiment of the present invention.
Figure 8:
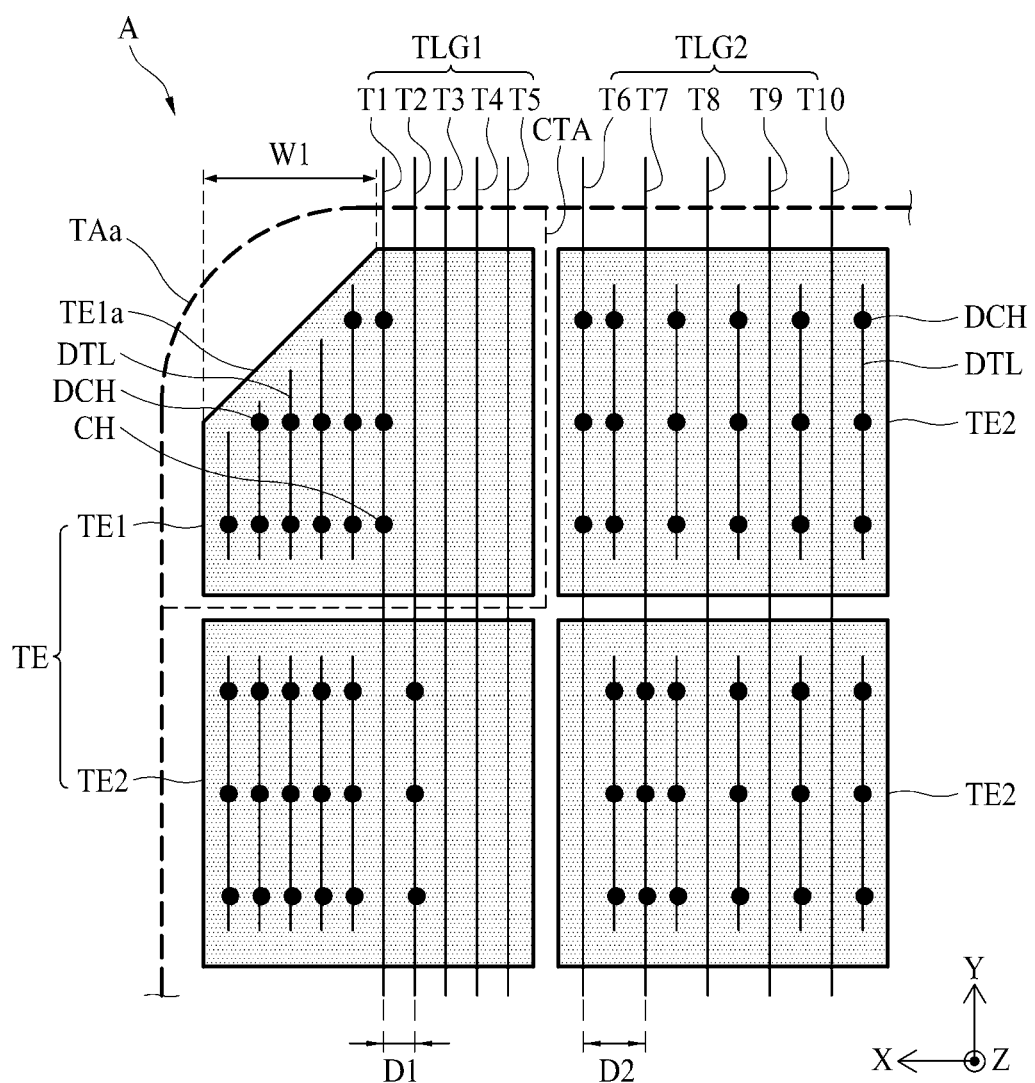
FIG. 8 is an enlarged view of a portion A shown in FIG. 7.

FIG. 7 is a plane view illustrating a connection structure between a plurality of common electrodes and a driving circuit portion in a display device according to another embodiment of the present invention, and FIG. 8 is an enlarged view of a portion A shown in FIG. 7. In FIGS. 7 and 8, arrangement of the plurality of touch link lines shown in FIG. 6 is modified. Therefore, the plurality of touch link lines and their related elements will be described, and repeated description of the other elements will be omitted or briefly described.

Referring to FIGS. 7 and 8, in the display device according to this embodiment, each of the plurality of touch link lines T1 to Tp is connected with the plurality of common electrodes TE one to one through a plurality of contact holes CH.

Each of the plurality of touch link lines T1 to Tp is made of metal or alloy having electrical conductivity more excellent than that of the common electrodes TE. For example, the plurality of touch link lines T1 to Tp may have a single layered structure or multi-layered structure made of a metal material such as Mo, Ag, Ti, Cu, Al, Ti/Al/Ti, and Mo/Al/Mo.

Among the plurality of touch link lines T1 to Tp, the touch link lines passing through the non-corner common electrode TE2 and the corner common electrode TE1 may be arranged at a first interval D1, and the touch link lines passing through the non-corner common electrode TE2 only may be arranged at a second interval D2 different from the first interval D1. In this case, the first interval D1 may be narrower than the second interval D2.

The plurality of touch link lines T1 to Tp according to one embodiment may be categorized into a first group TLG1 and a second group TLG2.

The first group TLG1 includes touch link lines T1 to T5 and Tp-4 to Tp passing through the non-corner common electrode TE2 and the corner common electrode TE1 while being spaced apart from one another at the first interval D1 along the first direction X in parallel with the second direction Y.

The touch link lines T1 to T5 and Tp-4 to Tp of the first group TLG1 are arranged at both edge portions of the touch area TA that includes a corner touch area CAT of the touch area TA. Therefore, the touch link lines T1 to T5 and Tp-4 to Tp of the first group TLG1 are arranged to pass through all of two corner common electrodes TE1 and the plurality of non-corner common electrodes TE2 based on the second direction Y. For example, although five touch link lines T1 to T5 and Tp-4 to Tp having the first interval D1 may pass on one corner common electrode TE1, the present invention is not limited to this example.

The second group TLG2 includes touch link lines T6 to T10 passing through the non-corner common electrodes TE2 only while being spaced apart from one another at the second interval D2 different from the first interval D1 along the first direction X in parallel with the second direction Y.

The touch link lines T6 to T10 of the second group TLG2 are arranged on the other touch area TA except both edge portions of the touch area TA that includes a corner touch area CAT of the touch area TA. Therefore, the touch link lines T6 to T10 of the second group TLG2 are arranged to pass through the non-corner common electrodes TE2 only based on the second direction Y. For example, although five touch link lines T6 to T10 having the second interval D2 may pass on the non-corner common electrodes TE2, the present invention is not limited to this example.

The touch link lines T1 to T5 and Tp-4 to Tp of the first group TLG1 arranged on the corner common electrode TE1 are overlapped with the other area except the chamfer portion TE1a provided in the corner common electrode TEL That is, the touch link lines T1 to T5 and Tp-4 to Tp of the first group TLG1 do not pass through the chamfer portion TE1a provided in the corner common electrode TE1 or are not overlapped with the chamfer portion TE1a. Therefore, the touch link lines T1 to T5 and Tp-4 to Tp of the first group TLG1 have the first interval D1 narrower than the second interval D2 to completely pass through the other portion of corner common electrodes TE1 spaced apart from one other by the chamfer portion TE1a. That is, the touch link lines T1 to T5 and Tp-4 to Tp of the first group TLG1 have a pitch narrower than that of the touch link lines T6 to T10 of the second group TLG2 by being spaced apart from the chamfer portion TE1a of the corner common electrode TE1.

Each of the plurality of common electrodes TE is electrically connected with the plurality of touch link lines T1 to Tp through the same number of contact holes CH. For example, although each of the plurality of common electrodes TE may electrically be connected with the plurality of touch link lines T1 to Tp through three contact holes CH, each of the plurality of common electrodes TE may electrically be connected with the plurality of touch link lines T1 to Tp through N (N is a natural number of 2 or more) contact holes CH without limitation to three contact holes.

Each of the first touch link lines T1 and Tp-4 and the last touch link lines T5 and Tp of the touch link lines T1 to T5 and Tp-4 to Tp of the first group TLG1 may electrically be connected with the corresponding corner common electrodes TE1 through three contact holes CH, and the other touch link lines T2 to T4 and Tp-3 to Tp-1 may electrically be connected with the non-corner common electrodes TE2 through three contact holes CH. Likewise, each of the touch link lines T6 to T10 of the second group TLG2 may electrically be connected with the corresponding non-corner common electrodes TE2 through three contact holes CH.

The contact holes CH are provided in crossing areas of the touch link lines T1 to T10 and the common electrode TE, whereby the touch link lines T1 to T10 are electrically connected with the common electrode TE. At this time, a contact area between the touch link lines T1 to T10 and the common electrode may be set by the number of contact holes CH and is increased as the number of contact holes CH provided in the crossing areas of the touch link lines T1 to T10 and the common electrode TE is increased. If the contact area between the touch link lines T1 to T10 and the common electrode TE is increased, contact resistance between the touch link lines T1 to T10 and the common electrode TE may be reduced. Therefore, in this embodiment, based on a width W1 of the chamfer portion TE1a provided in the corner common electrodes TE1, the first interval D1 (or pitch) of the touch link lines T1 to T5 and Tp-4 to Tp of the first group TLG1 electrically connected with the corner common electrodes TE1 is set to be narrower than the second interval D2 (or pitch) of the touch link lines T6 to T10 of the second group TLG2 electrically connected with the non-corner common electrodes TE2, whereby a contact area (or the number of contact holes) between the corner common electrodes TE1 and the touch link lines T1 to T5 and Tp-4 to Tp and a contact area (or the number of contact holes) between the non-corner common electrodes TE2 and the touch link lines T6 to T10 may be the same as each other.

Additionally, the display device according to this embodiment further comprises dummy lines DTL.

Each of the dummy lines DTL is arranged between two adjacent touch link lines T6 to T10 in parallel with the touch link lines T6 to T10 on each of the non-corner common electrodes TE2. At this time, at least one dummy line DTL may be arranged between two adjacent touch link lines T6 to T10. Each of the dummy lines DTL is electrically connected with the corresponding common electrode TE through a dummy contact hole DCH. The dummy lines DTL arranged on each of two adjacent non-corner common electrodes TE2 along the second direction Y are electrically disconnected from one another without being electrically connected with one another. That is, the dummy lines DTL are arranged on the non-corner common electrodes TE2 only.

The respective dummy lines DTL according to one embodiment are arranged to be parallel with the touch link lines T6 to T10 on each of the corner common electrodes TE1 at outer edges of the corner common electrodes TE1. Each of the dummy lines DTL is electrically connected with the corresponding corner common electrode TE1 through the dummy contact hole DCH. At this time, each of the dummy lines DTL arranged on the corner common electrodes TE1 is electrically disconnected from the dummy lines DTL arranged on the adjacent non-corner common electrodes TE2 along the second direction Y.

Each of the dummy lines DTL according to one embodiment is made of metal or alloy having electrical conductivity more excellent than that of the common electrodes TE. For example, the dummy lines DTL may be made of the same metal material as that of the plurality of touch link lines T1 to Tp. The dummy lines DTL prevents color shift from being generated from an image transmitting the common electrode TE by means of the touch link lines T6 to T10, and increases touch sensitivity by reducing surface resistance of the common electrodes TE made of a transparent conductive material.

In the display device according to this embodiment, since the contact areas between the common electrodes TE and the corresponding touch link lines T1 to Tp are all the same as one another, deviation of touch sensitivity between the non-corner common electrodes TE2 and the corner common electrodes TE1, which have different shapes (or different sizes), may be minimized, whereby touch sensitivity for the corner touch area CTA may be improved.

Figure 9:
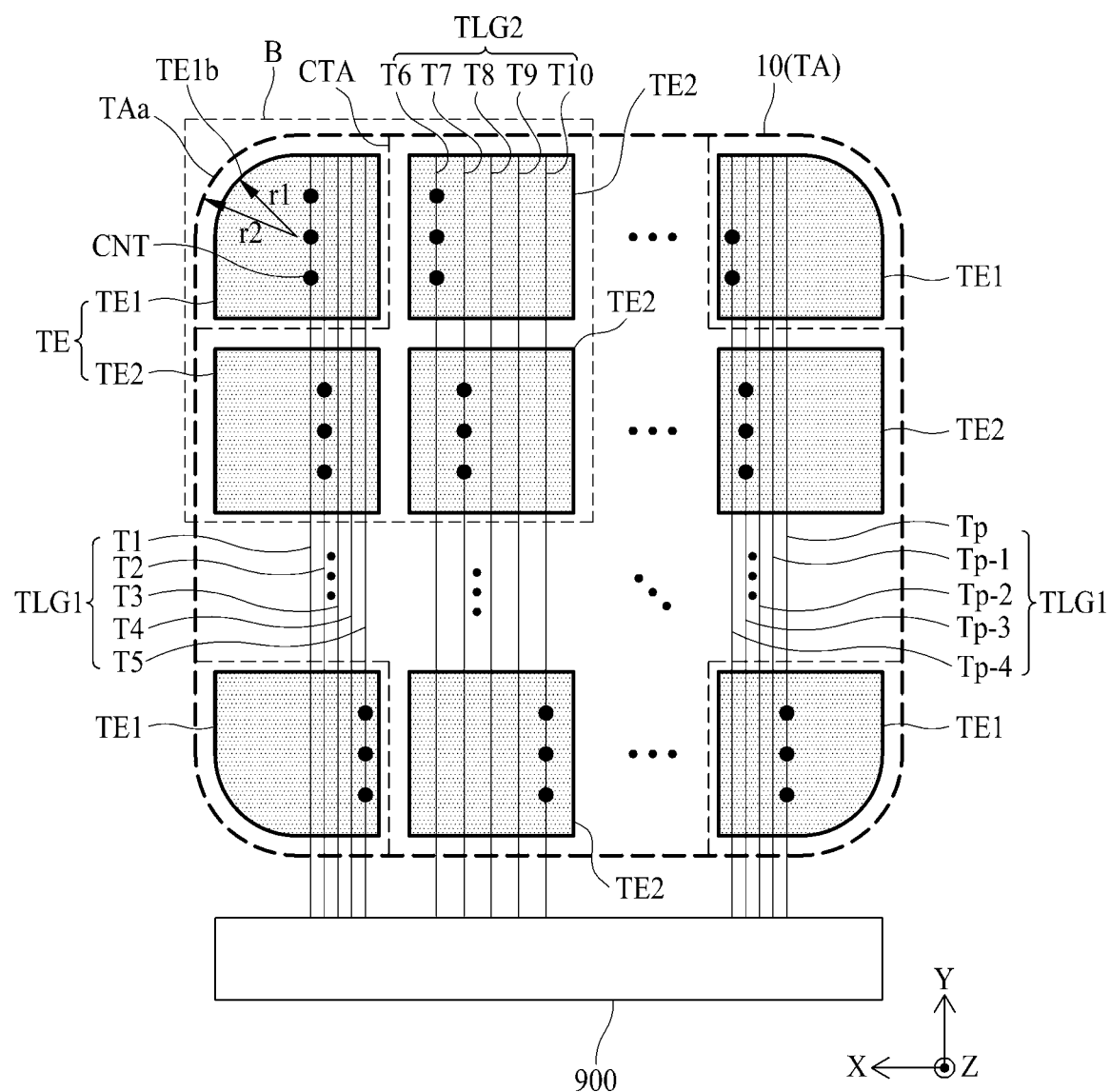
FIG. 9 is a plane view illustrating a connection structure between a plurality of common electrodes and a driving circuit portion in a display device according to other embodiment of the present invention.
Figure 10:
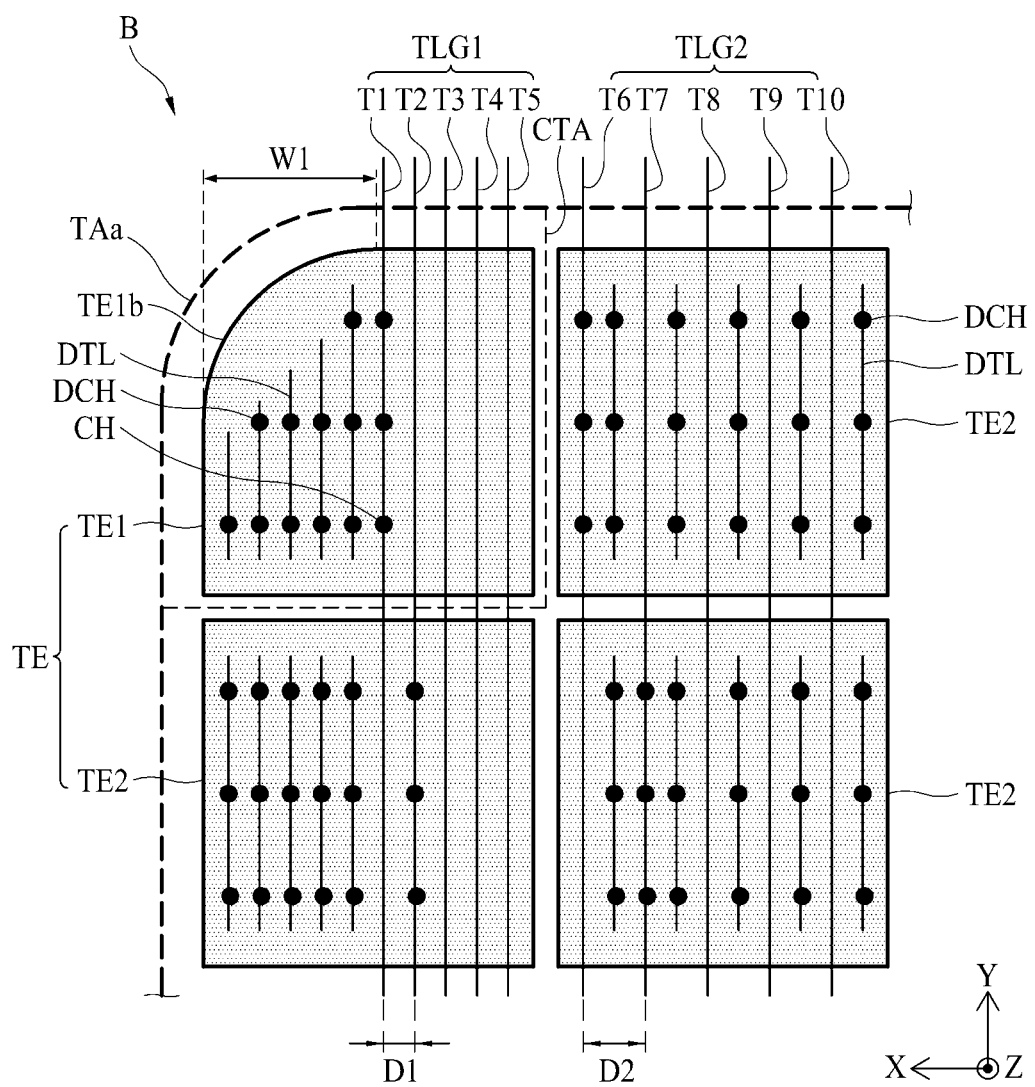
FIG. 10 is an enlarged view of a portion B shown in FIG. 9.

FIG. 9 is a plane view illustrating a connection structure between a plurality of common electrodes and a driving circuit portion in a display device according to other embodiment of the present invention, and FIG. 10 is an enlarged view of a portion B shown in FIG. 9. In FIGS. 9 and 10, the shape of corner common electrodes shown in FIG. 7 is modified. Therefore, the plurality of corner common electrodes and their related elements will be described, and repeated description of the other elements will be omitted or briefly described.

Referring to FIGS. 9 and 10, in the display device according to this embodiment, the corner common electrodes TE1 may have a different shape (or different size) from the non-corner common electrodes TE2. The corner common electrodes TE1 according to this embodiment have a square shape, and include a rounding portion TE1*b* rounded in a curved shape having a predetermined curvature radius at one corner portion adjacent to the corner portion TAa of the touch area T1. The non-corner common electrodes TE2 have a square shape.

The rounding portion TE1b of the corner common electrodes TE1 may have a first curvature radius r1, and the corner portion TAa of the touch area TA may have a second curvature radius r2 different from the first curvature radius r1. At this time, a center point of the first curvature radius r1 may be the same as that of the second curvature radius r2. That is, the rounding portion TE1*b* of the corner common electrodes TE1 and the corner portion TAa of the touch area TA may be formed in parallel with each other in a concentric circle shape. Therefore, in this embodiment, size deviation between the corner common electrodes TE1 and the non-corner common electrodes TE2, which is generated due to the corner portion TAa of the touch area TA, may be minimized, whereby touch sensitivity deviation between the corner common electrodes TE1 and the non-corner common electrodes TE2 may be minimized.

In the display device according to this embodiment, since the contact areas between the common electrodes TE and the corresponding touch link lines T1 to Tp are all the same as one another, deviation of touch sensitivity between the non-corner common electrodes TE2 and the corner common electrodes TE1, which have different shapes (or different sizes), may be minimized, whereby touch sensitivity for the corner touch area CTA may be improved.

As described above, according to the present invention, each corner portion of the screen is formed in a curved shape, whereby an improved esthetic design may be obtained, the screen of the corner portion may be displayed more naturally, and uniform touch sensitivity may be obtained for the touch area as well as the corner portion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
   a substrate including a touch area having a corner touch area;
   a plurality of gate lines arranged on the substrate in a first direction;
   a plurality of data lines arranged in a second direction crossing the first direction;
   a plurality of pixel areas at crossings of the plurality of gate lines and the plurality of data lines;
   a plurality of common electrodes arranged to overlap at least one pixel area; and
   a plurality of touch link lines each of which is electrically connected with a corresponding one of the plurality of common electrodes and extended in a direction parallel with the first direction or the second direction,
   wherein, among the plurality of touch link lines, a first interval between first touch link lines passing through first common electrodes arranged in an edge of the touch area including the corner touch area is different from a second interval between second touch link lines passing through second common electrodes arranged in other touch area except the edge of the touch area through which the first touch link lines pass.

2. The display device of claim 1, wherein the first interval is narrower than the second interval.

3. The display device of claim 2, wherein the first common electrode has a shape different from that of the second common electrode.

4. The display device of claim 2, wherein the first common electrode has a size different from that of the second common electrode.

5. The display device of claim 1, wherein each of the plurality of common electrodes is connected with a corresponding one of the plurality of touch link lines through the same number of contact holes.

6. The display device of claim 1, wherein the plurality of common electrodes are used as touch electrodes for touch sensing.

7. The display device of claim 1, further comprising:
   first dummy lines each of which is electrically connected with a corresponding one of the first common electrodes, the first dummy lines not present between the first touch link lines;

second dummy lines each of which is electrically connected with the second common electrodes, at least one of the second dummy lines present between the second touch link lines.

8. A display device comprising:

a plurality of common electrodes, the common electrodes comprising first common electrodes arranged in an edge of a touch area of the display device in a first direction including a corner touch area, and second common electrodes arranged in other touch area except the edge of the touch area; and a plurality of touch link lines including first touch link lines and second touch link lines, each of the first touch link lines electrically connected with a corresponding one of the first common electrodes and spaced apart from each other at a first interval, and each of the second touch link lines electrically connected with a corresponding one of the second common electrodes and spaced apart from each other at a second interval wider than the first interval.

9. The display device of claim 8, wherein the first common electrodes at the corner touch area each includes a chamfer portion or a rounding portion.

10. The display device of claim 9, wherein the first touch link lines are spaced apart from the chamfer portion or the rounding portion of the corner touch area of the first common electrodes.

11. The display device of claim 8, wherein the first common electrode has a shape different from that of the second common electrode.

12. The display device of claim 8, wherein the first common electrode has a size different from that of the second common electrode.

13. The display device of claim 8, further comprising:

first dummy lines each of which is electrically connected with a corresponding one of the first common electrodes, the first dummy lines not present between the first touch link lines;

second dummy lines each of which is electrically connected with the second common electrodes, at least one of the second dummy lines present between the second touch link lines.

* * * * *